Nov. 29, 1927.

J. C. ANDERSON 1,650,886

FURNACE

Filed May 3, 1926     6 Sheets-Sheet 1

Inventor
J. C. ANDERSON,
By
Attorney

Nov. 29, 1927.
J. C. ANDERSON
1,650,886
FURNACE
Filed May 3, 1926    6 Sheets-Sheet 2
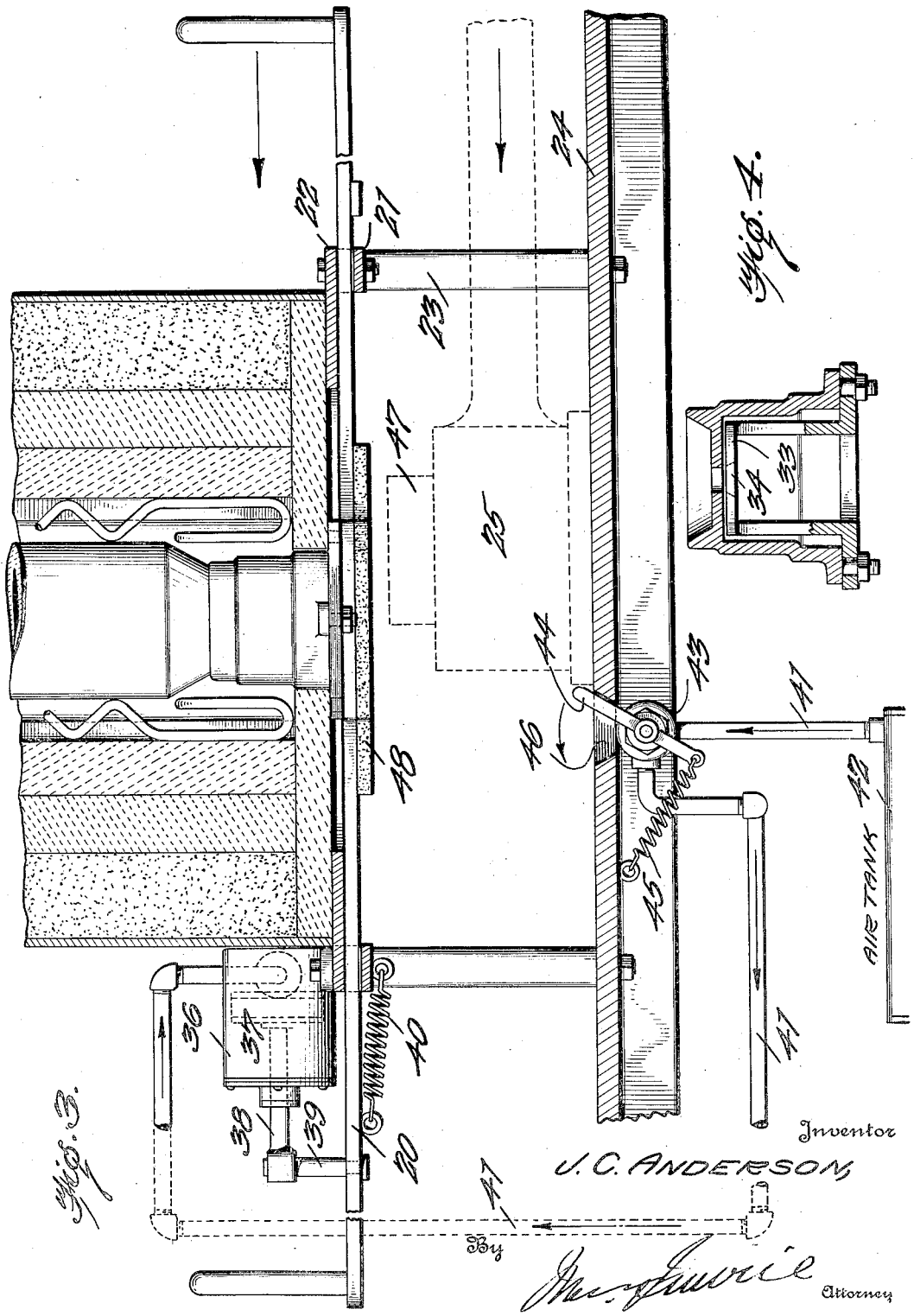

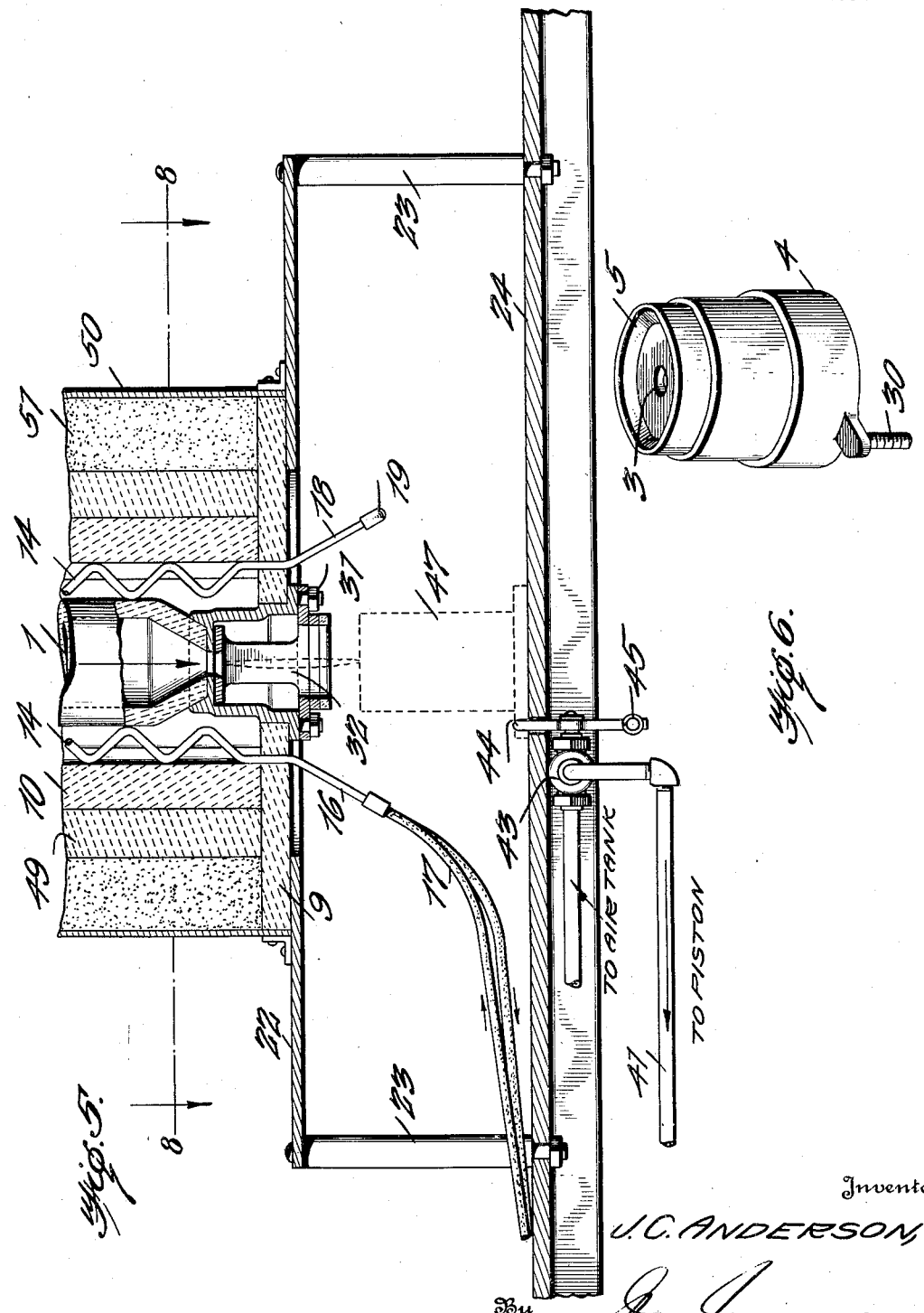

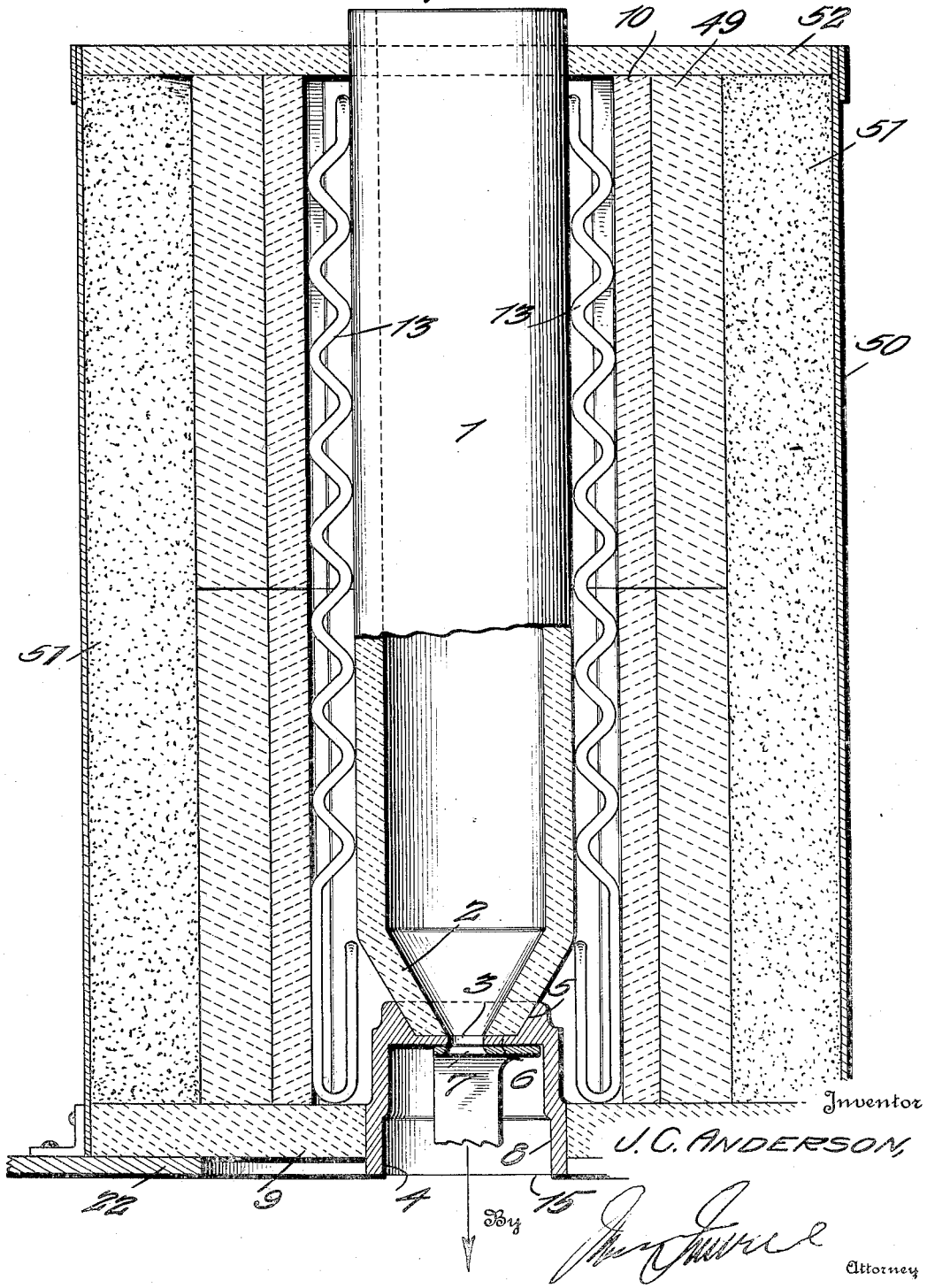

Nov. 29, 1927. 1,650,886
J. C. ANDERSON
FURNACE
Filed May 3, 1926 6 Sheets-Sheet 5

Inventor
J. C. ANDERSON,
By
Attorney

Nov. 29, 1927.

J. C. ANDERSON

FURNACE

Filed May 3, 1926

Inventor
J. C. ANDERSON,
By
Attorney

Patented Nov. 29, 1927.

1,650,886

UNITED STATES PATENT OFFICE.

JAMES C. ANDERSON, OF WASHINGTON, DISTRICT OF COLUMBIA.

FURNACE.

Application filed May 3, 1926. Serial No. 106,452.

This invention relates to a method of and means for reducing a vitrified substance, such as glass, to a flowing condition to permit its delivery in regulatable quantities to a mold for the production of specific articles.

The reduction of glass to a molten condition, in which under the influence of gravity, it will to a certain extent be sufficiently fluid to separate in globule or drop form, but in this condition it can not be used in molds for owing to its nature it will not of itself reach all parts of the mold to which it is delivered, but will accumulate in drops or masses which cannot be handled. There is thus a definite distinction in the use of the term "melting" in the present specification, in that there is thereby indicated a reduction of the glass to a sufficiently fluid point to permit it to flow almost as a liquid, whereby in its delivery to the mold, a proper and even distribution of the glass results as a matter of course.

Therefore, the essential object of the present invention is the provision of means by which glass may be reduced to that liquid condition which will cause it to flow into the molds.

In preparing glass for delivery to comparatively small molds, it is essential that the delivery outlet of the glass be comparatively small for if the glass in falling into the mold contacts with the side of the mold, it at once adheres thereto and a proper filling of the mold is impossible.

Furthermore, it is important that the means for cutting off or permitting the flow of glass be arranged as far as possible from direct contact with the comparatively cool surrounding air in order that the glass may be subjected to the heated action even after it passes through the crucible outlet and before it reaches the mold. To this end, the furnace, includes a means for supporting the crucible which is disposed above the bottom of the furnace and the cutoff operates within this supporting means, and such cutoff as well as the supporting means is subjected to the direct heating effect of the heating units. Thus the glass when brought to the proper liquid condition, is caused to flow through a comparatively small opening with the crucible at the point immediately adjacent this opening subjected to the maximum degree of heat possible without destroying the crucible.

A further object is the provision of means by which the glass flow to the mold is automatically controlled by positioning the mold with respect to the melting pot or furnace, whereby the operator by the simple act of placing and withdrawing the mold will control the delivery of the liquid glass thereto.

The invention is illustrated in the accompanying drawings, in which:

Fig. 3 is a sectional view partly in elevation of the furnace, showing the mold in dotted lines and in the position occupied just prior to glass delivery, taken on line 3—3 of Fig. 11.

Fig. 4 is a sectional detail of the cut off.

Fig. 5 is a sectional view on line 5—5 of Fig. 11, showing the mold in position to open the cut off to permit the delivery of the glass.

Fig. 6 is a perspective view of the crucible base and support.

Fig. 7 is a view in vertical section, partly in elevation, of the furnace proper.

Figure 1:
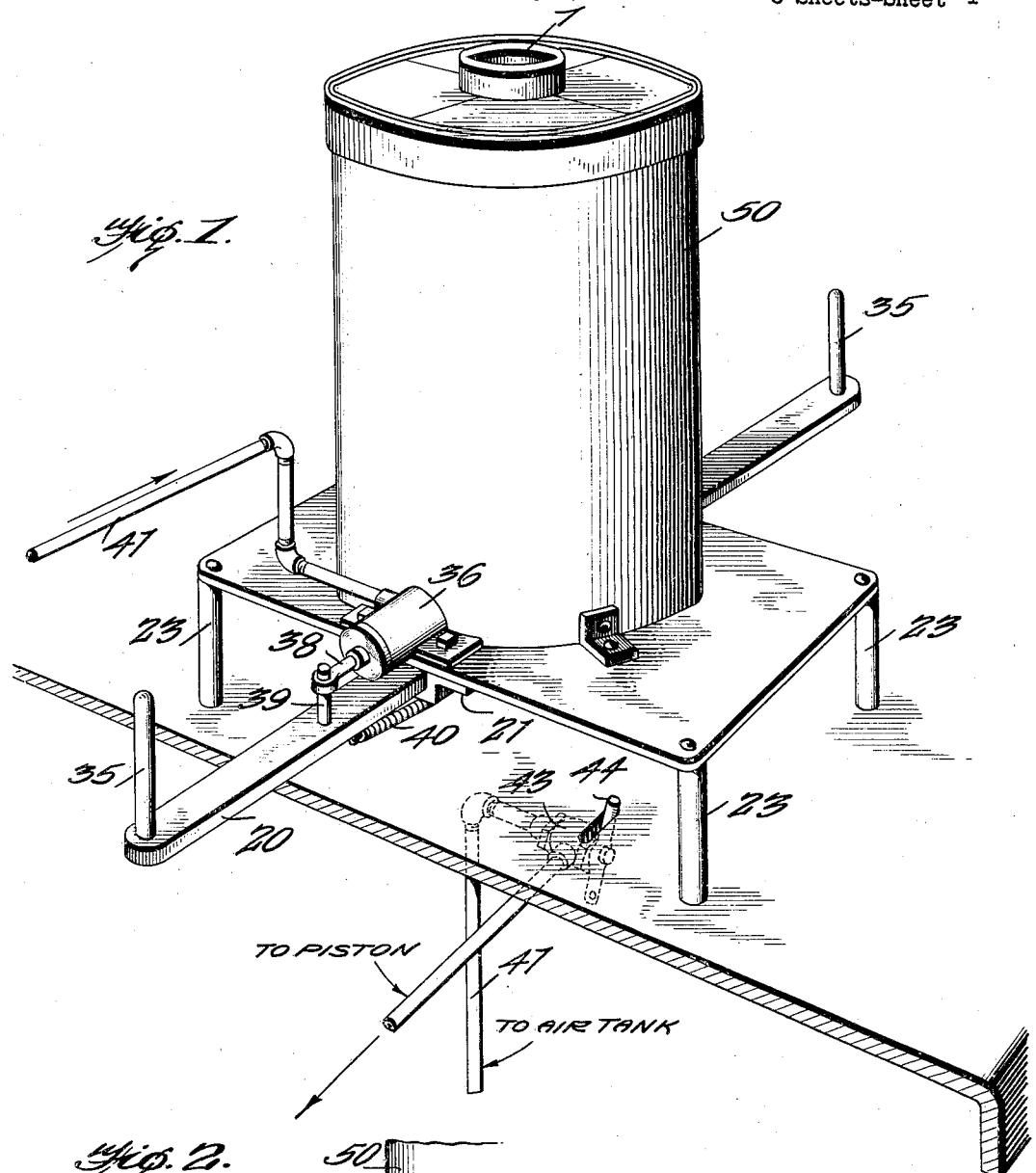
Fig. 1 is a perspective view of the improved furnace.
Figure 2:
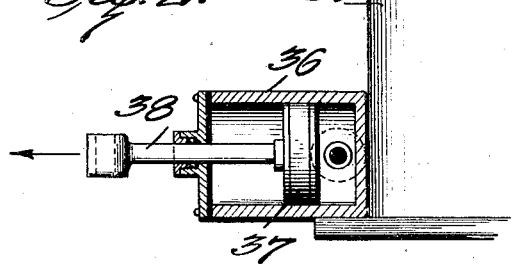
Fig. 2 is a view in section showing the means for operating the cut off.

The improved furnace proper comprises a crucible 1, of suitable refractory material, of hollow cylindrical form, with a convergent discharge portion 2 at the lower end terminating in an outlet 3. The crucible is supported in a metallic base 4, having an upper opening 5 to snugly receive the lower end of the convergent discharge portion 2 of the crucible, the base including a ledge 6 underlying the lower end of the crucible and formed with an opening 7 to align with the opening 3 in the crucible. Below the ledge 6, the base is in the form of an annular wall 8, which extends through and snugly fits an opening in the bottom wall 9 of the furnace, which wall is of circular form and of refractory material.

Figure 8:
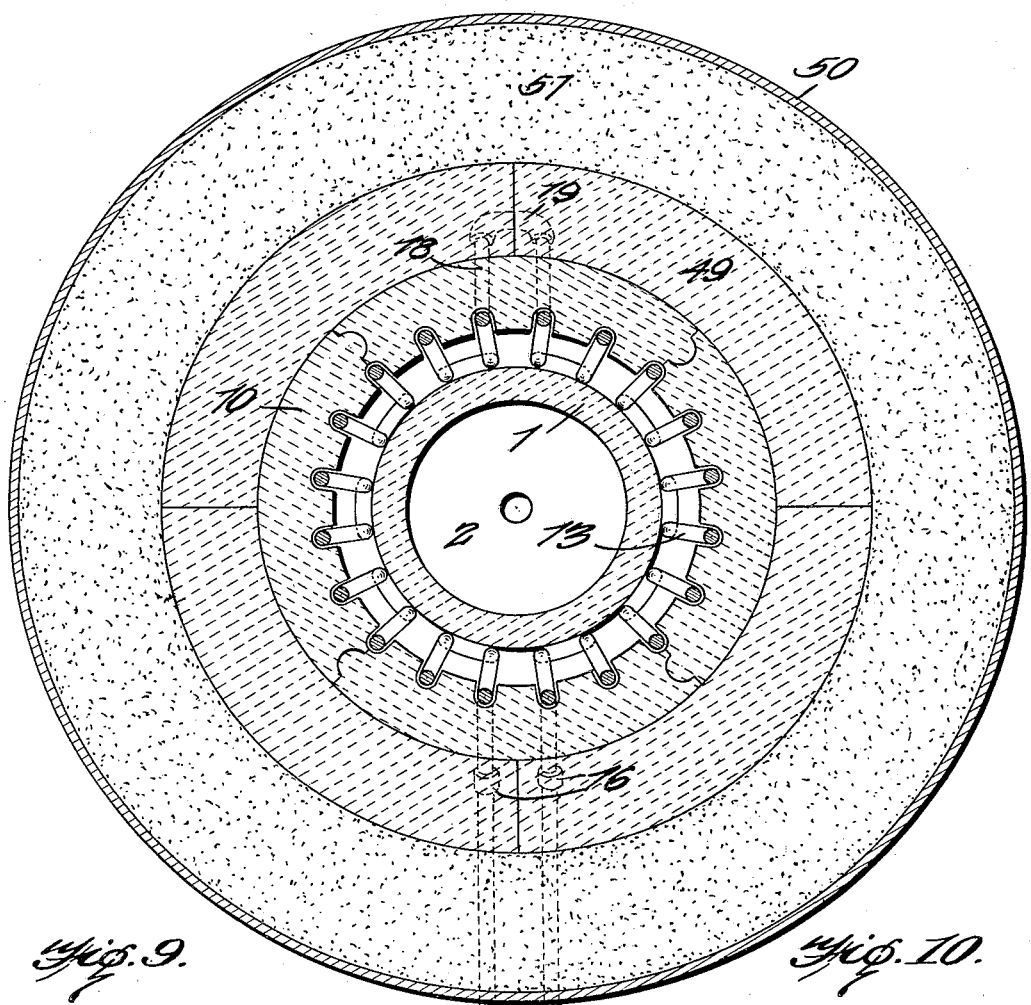
Fig. 8 is a section on line 8—8 of Fig. 5.
Figure 9:
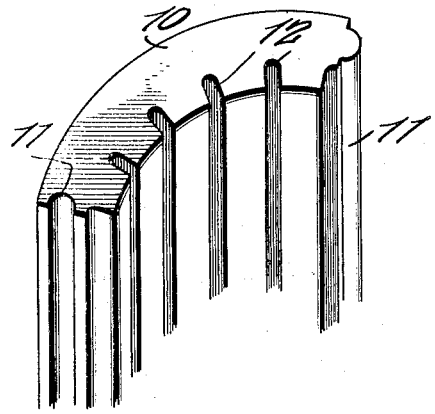
Fig. 9 is a broken perspective of one of the sections of that wall of the furnace serving to support the heating elements.
Figure 10:
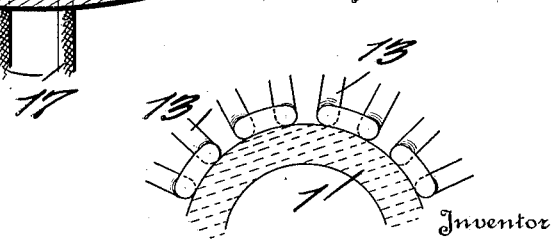
Fig. 10 is a transverse section showing the arrangement of the heating elements at the lower end of the crucible.
Figure 11:
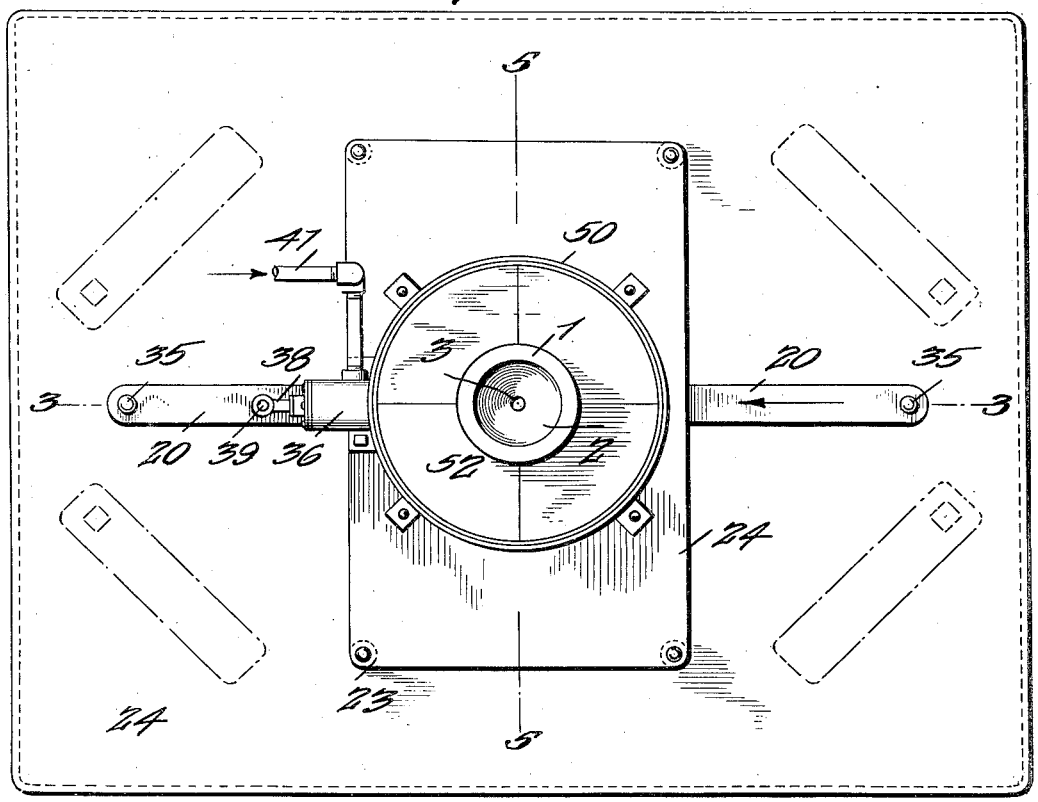
Fig. 11 is a plan view of the furnace.
Figure 12:
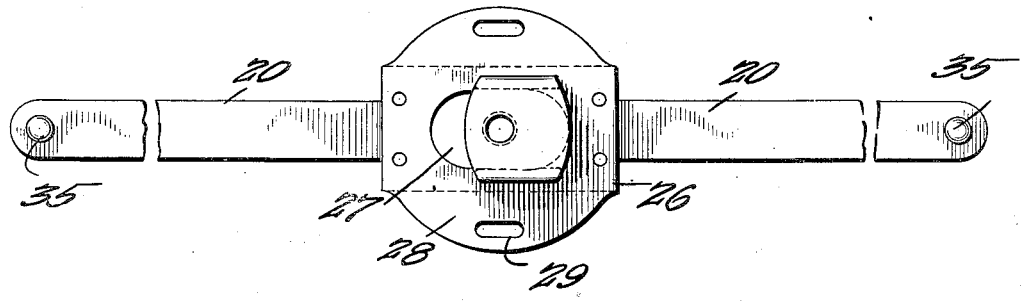
Fig. 12 is a plan view of the cut off.

Supported upon the bottom wall 9 in annular spaced relation to the crucible is a wall 10 of refractory material serving as a guide and support for the heating element and hereinafter termed the heater support. This wall 10 is, as will be plain from Fig. 8, made up in sections having longitudinally cooperating ribs and recesses 11 on their meeting edges to insure accurate positioning. The sections are formed with longitudinally ranging channels 12 to receive and support the heater hereinafter described, and obviously, as indicated in Fig. 7, this heater support may be made up in separable vertical sections as well as separable annular sections.

The heating element is made up of two metallic units, each of appropriate wire form capable of becoming incandescent or heat productive in the passage of the electric current. These units are peculiarly constructed to afford the maximum heat throughout the length of the crucible, and to provide a materially increased heat production or radiation at a particular point in the crucible. Each unit comprises a series of vertically ranging parallel interconnected lengths 13 of sinuous form as at 14. The wavy or sinuous forms of each wire length is of such transverse dimension as to take up the space between the bottoms of the channels 12 of the heater support wall 10 and the outer surface of the crucible 1. The channels in the heater support thus serve to position and support the respective lengths of the heater units, and by such sinuous formation a materially greater length of unit can be accommodated within the length of the furnace, with resultant increased heating effect than would be possible if the wire lengths were straight.

As stated, each heating unit is made up of a series of interconnected parallel lengths of sinuous formation, the respective lengths being of course alternately connected at the upper and lower ends of the unit. As it is important that the maximum heating effect of the unit be delivered at the lower end of the crucible, I arrange the units to secure this result by making those lengths which would be connected at their lower ends of a length exceeding that necessary to fit in the furnace and turn the excess length portions as 15 upwardly and inwardly so that the upper terminals of these inturned portions are about on a level with the upper end of the convergent delivery portion of the crucible, as indicated in Fig. 7. Thus, in this lower portion of the crucible and furnace, there is an additional heating effect from this additional length of heating unit, and this additional effect is provided at the extreme melting or delivery point of the crucible. It is to be particularly noted that the inturned ends of the heating units extend throughout the length of the converging portion of the crucible and also throughout a greater portion of the length of the base, and that the cutoff operates well within this heated zone, thus protecting the glass even following its delivery from the crucible from coming in contact with any cooling medium.

The initial length of the respective units as at 16, Fig. 5, projects through the bottom wall 9 of the furnace and are connected to electric service conductors 17, the final lengths of the units, as indicated at 18, Fig. 5, also extending through the bottom wall of the furnace and being removably interconnected at 19 to arrange said units in series, as will be apparent.

The sinuous arrangement of the lengths of the heating units insures the maximum capacity incident to the length of the unit and permits the unit to directly contact with the crucible at various points throughout its length and circumference. Thus the crucible is very highly heated throughout its length and additionally heated to a large degree at its extreme lower or delivery portion by the increased length of unit provided through the inturned ends described.

By providing the channels 12 in the heater support wall, the wire lengths of the heater units are held in fixed spaced relation and thus the maximum number of lengths of material may be incorporated up to the limit permitted by the space, while of course preventing the current bridging from one unit to the adjacent unit.

An essential feature and result of the above construction is that the greatest possible extent of electrical heating medium may be incorporated in the furnace and held in a conveniently rigid and fixed position while in use without permitting short circuiting of the adjacent conductors. This distinguishes from the usual coiled resistance, which if closely wound for maximum heating, tends to a liability of short circuiting.

In connection with the furnace, there is provided an automatically controlled cut off comprising a bar 20, slidably supported in brackets 21 carried by a bed plate 22 on which the furnace rests, the bed plate in turn being supported by pillows 23 from a table 24, on which latter the mold carrier 25 is adapted to be moved. The bar 20 is provided with an enlarged plate 26 formed with an opening 27 and having lateral portions 28 formed with slots 29 to slidably engage bolts 30 depending from the crucible base 4, nuts 31 holding the plate in slidable relation to the crucible base. The plate is formed at one side of the opening 27 with an upstanding section 32, at the upper end of which is a cut off plate 33 formed with an opening 34, adapted in one position of the cut off to register with the outlets 3 and 7, and in another position of the cut off to close the outlets.

The cutoff is adapted to be automatically actuated, for which purpose the bars 20, which may be provided with handles 35 for manual operation when necessary, are connected to a pneumatic operator, here shown as a cylinder 36 having a piston 37, the rod 38 of which is connected to a post 39 on one of the arms 20, a spring 40 being connected between said arm and one of the brackets 21 to oppose the movement of the piston. The piston is connected by a pipe 41 to a source of air under pressure, as a tank 42, there being interposed in the pipe 41 a valve 43 operated through the medium of a lever 44 connected by a spring 45 to the table 24 to normally hold the valve closed. The valve operating lever 44 extends through an opening 46 in the table 24, so that the upper end of the lever is in the path of movement of the mold carrier 25. Obviously, as the mold carrier, carrying the mold 47, is moved to a position beneath the crucible, the valve lever 44 will be operated, fluid pressure admitted to the cylinder 36, and the cut off moved to open the outlet and permit the molten glass to flow to the mold. Movement of the carrier and mold in a direction from the furnace cuts off the fluid pressure and exhausts the cylinder through a suitable vent, whereupon spring 40 closes the cut off to stop the flow of glass.

Glass particles are placed in the crucible and the current passed through the heater units. The heat thus produced tends to reduce the glass to a molten condition, and as such flows to the converging discharge end of the crucible, where the additional heat is provided by the particular form of the units, the glass is further heated to render it in a melted condition as distinguished from the ordinary molten condition. In other words, when subjected to this maximum degree of heat, the glass is in a position to flow substantially as a fluid. The mold carrier with contained mold is then moved to a position, through appropriate guides, if necessary, beneath the furnace, this movement automatically opening the cut off and permitting the glass to flow into the mold. Reverse movement of the mold carrier cuts off the flow of glass, as has been described. If desired, the under portion of the cut off may be protected against the heat of the glass in the mold by a layer of refractory material indicated at 48. The furnace proper beyond the heater support wall 10, may be reinforced in any suitable manner. For this purpose, it is preferred that a comparatively thick refractory wall 49 be arranged beyond and in contact with the heater support wall 10, there being arranged beyond and spaced from this wall 49 a metallic shell 50, constituting the outer wall of the furnace. The space between the wall 49 and shell 50 is preferably filled with refractory material in more or less comminuted form as indicated at 51, and the upper portion of the furnace beyond the crucible is closed by a top wall 52, which overlies the intermediate walls and is secured within the upper edge of the shell 50.

What I claim is:

1. A furnace for heating glass to a flowing state, including a crucible in which the glass is placed having a converging outlet, and electrical heating units of sinuous form disposed about and arranged to encircle the crucible, said heating units being formed to increase their heating capacity immediately surrounding the converging outlet of the crucible.

2. A furnace for heating glass to a flowing state, including a crucible in which the glass is placed having a converging outlet, electrical heating units arranged about the crucible, and comprising interconnected parallel wire lengths of sinuous form with the ends of such lengths adjacent the crucible outlet being formed in return bends on themselves to increase the heating effect at this point, and means for connecting said units in series.

3. A furnace for heating glass to a flowing state, including a crucible in which the glass is placed, electrical heating units of sinuous form disposed about and arranged to encircle the crucible, a cut off for the material from the crucible, and means for automatically operating the cut off.

4. A furnace for heating glass to a flowing state, including a crucible in which the glass is placed, electrical heating units of sinuous form disposed about and arranged to encircle the crucible, a cut off for the material from the crucible, a table arranged below the furnace to support a mold in position to receive material from the crucible, and means operative by the positioning of the mold to automatically actuate the cut off.

5. A furnace for melting glass, a crucible to receive the glass and having a converging outlet, a heating supporting wall surrounding the crucible and formed with longitudinally ranging channels, and heating units arranged between said wall and crucible and formed of wire lengths interconnected at their respective ends and of sinuous form to bear in said channels and against the crucible.

6. A furnace for heating glass to a flowing state, including a crucible in which the glass is placed having a converging outlet, and electrical heating units arranged to encircle the crucible, said heating units being formed to increase their heating capacity immediately surrounding the converging outlet of the crucible.

7. A furnace for heating glass to a flowing state, comprising a crucible having a convergent portion at the delivery end and formed with an outlet of materially less area than the interior of the crucible, heater units surrounding the crucible and formed to materially increase their heating effect throughout the length of the convergent portion of the crucible.

8. A furnace for heating glass to a flowing state, including a crucible having a convergent outlet with a restricted discharge opening, a hollow base for supporting the crucible, heater units surrounding the crucible and formed to present increased heating surface surrounding the converging portion of the crucible and the crucible base.

9. A furnace for heating glass to a flowing state, including a crucible having a convergent outlet with a restricted discharge opening, a hollow base for supporting the crucible, heater units surrounding the crucible and formed to present increased heating surface surrounding the converging portion of the crucible and the crucible base, and a cut off operating within the base above the lower open end thereof.

10. A furnace for heating glass to a flowing state, including a crucible having a convergent outlet with a restricted discharge opening, a hollow base for supporting the crucible, heater units of sinuous form longitudinally surrounding the crucible and formed to present increased heating surface surrounding the converging portion of the crucible and the crucible base.

In testimony whereof I affix my signature.

JAMES C. ANDERSON.